(12) United States Patent
Bosetti et al.

(10) Patent No.: US 11,117,739 B2
(45) Date of Patent: Sep. 14, 2021

(54) COMPOSTABLE MULTILAYER MEMBRANES AND CARTRIDGES USING SUCH MEMBRANES

(71) Applicant: Goglio S.p.A., Milan (IT)

(72) Inventors: Osvaldo Bosetti, Milan (IT); Andrea Maccagnan, Milan (IT); Roberto Galbasini, Milan (IT); Giuseppe Gullo, Milan (IT)

(73) Assignee: GOGLIO S.P.A., Milan (IT)

( * ) Notice: Subject to any disclaimer, the term of this patent is extended or adjusted under 35 U.S.C. 154(b) by 0 days.

(21) Appl. No.: 16/610,344

(22) PCT Filed: Apr. 24, 2018

(86) PCT No.: PCT/IB2018/052848
§ 371 (c)(1),
(2) Date: Nov. 1, 2019

(87) PCT Pub. No.: WO2018/203184
PCT Pub. Date: Nov. 8, 2018

(65) Prior Publication Data
US 2020/0087056 A1    Mar. 19, 2020

(30) Foreign Application Priority Data

May 4, 2017  (IT) .................. 102017000048363

(51) Int. Cl.
*B32B 7/12*       (2006.01)
*B65D 85/804*     (2006.01)
(Continued)

(52) U.S. Cl.
CPC .......... *B65D 85/8043* (2013.01); *B32B 5/022* (2013.01); *B32B 7/12* (2013.01);
(Continued)

(58) Field of Classification Search
CPC .......... B32B 2255/10; B32B 2255/205; B32B 2255/26; B32B 2307/306;
(Continued)

(56) References Cited

U.S. PATENT DOCUMENTS

2013/0323370 A1    12/2013  Gerbaulet et al.
2014/0037916 A1    2/2014   Reilly et al.
(Continued)

FOREIGN PATENT DOCUMENTS

EP          2218653 A1    8/2010

OTHER PUBLICATIONS

Formal Human Translation of Wons EP 2218653. Published 2010. (Year: 2010).*
(Continued)

*Primary Examiner* — Lawrence D Ferguson
(74) *Attorney, Agent, or Firm* — MH2 Technology Law Group LLP

(57) ABSTRACT

A compostable multilayer membrane may include: a first barrier layer containing a compostable barrier film; a first metallization layer; an intermediate layer containing at least one adhesive; a second barrier layer containing a compostable barrier film; a layer adjacent to the first barrier layer, on a side opposite to the first metallization layer, the adjacent layer comprising heat-resistant lacquer; a second metallization layer between the intermediate layer and the second barrier layer; and a filter made of nonwoven fabric. The compostable barrier film of the first barrier layer may not be made of cellulosic material. The compostable barrier film of the second barrier layer may not be made of cellulosic material. The compostable multilayer membrane may have an Oxygen Transfer Rate (OTR) value lower than 0.5 cc/m²/day/atm. The filter may be adjacent to the second barrier layer on a side opposite to the intermediate layer.

20 Claims, 3 Drawing Sheets

(51) Int. Cl.
*B32B 5/02* (2006.01)
*B32B 23/10* (2006.01)
*B32B 27/12* (2006.01)
*B65D 65/40* (2006.01)
*B65D 65/46* (2006.01)

(52) U.S. Cl.
CPC .............. *B32B 23/10* (2013.01); *B32B 27/12* (2013.01); *B65D 65/40* (2013.01); *B65D 65/466* (2013.01); *B32B 2255/205* (2013.01); *B32B 2255/26* (2013.01); *B32B 2307/306* (2013.01); *B32B 2307/514* (2013.01); *B32B 2307/7163* (2013.01); *B32B 2307/7244* (2013.01); *B32B 2439/40* (2013.01); *B32B 2439/70* (2013.01)

(58) Field of Classification Search
CPC .......... B32B 2307/514; B32B 2307/54; B32B 2307/7163; B32B 2307/724; B32B 2307/7244; B32B 2307/7265; B32B 23/04; B32B 23/10; B32B 2435/00; B32B 2439/40; B32B 2439/70; B32B 27/12; B32B 5/022; B32B 7/12; B65D 65/40; B65D 65/466; B65D 85/8043; Y02W 90/10

See application file for complete search history.

(56) References Cited

U.S. PATENT DOCUMENTS

| | | |
|---|---|---|
| 2014/0366745 A1 | 12/2014 | Goglio et al. |
| 2017/0008694 A1 | 1/2017 | Andreae et al. |
| 2017/0107034 A1 | 4/2017 | Okamoto et al. |

OTHER PUBLICATIONS

International Search Report and Written Opinion of the International Searching Authority, dated Jun. 29, 2018, in corresponding International Application No. PCT/IB2018/052848, 13 pages.

* cited by examiner

COMPOSTABLE MULTILAYER MEMBRANES AND CARTRIDGES USING SUCH MEMBRANES

CROSS-REFERENCE TO RELATED APPLICATION(S)

This application is a national stage entry from International Application No. PCT/IB2018/052848, filed on Apr. 24, 2018, in the Receiving Office ("RO/IB") of the International Bureau of the World Intellectual Property Organization ("WIPO"), and published as International Publication No. WO 2018/203184 A1 on Nov. 8, 2018; International Application No. PCT/IB2018/052848 claims priority from Italian Patent Application No. 102017000048363, filed on May 4, 2017, in the Italian Patent and Trademark Office ("IPTO"), the entire contents of all of which are incorporated herein by reference.

FIELD OF THE INVENTION

The present application relates to a compostable multilayer membrane as defined in the preamble of claim 1.

Particularly, but without limitation, the multilayer membrane is suitable for use in cartridges containing coffee or soluble products for producing a beverage by means of an extraction apparatus using water or other fluids under pressure or in fluid-tight containers or in other similar products or devices that must be sealed or stopped.

BACKGROUND OF THE INVENTION

Composting is an organic waste recycling process that is used to obtain a natural fertilizer, known as compost, comprising biodegradable organic materials that may be classified as wet matter (waste from fruit and vegetables, coffee grounds and tea filters, molded bread, eggshells and bones, grass clippings) and dry matter (dry leaves, sawdust, straw, small branches, wood shavings and bark, common paper and paper towel, cardboard).

According to the standard EN 13421, waste can be deemed to be compostable if it meets the following requirements: a) at least 90% biodegradability to be reached in less than 6 months; b) disintegrability, e.g. fragmentation and loss of visibility in the final compost. The fraction of the residues of test material with dimensions higher than 2 mm must be less than 10% of the initial mass; c) low levels of heavy metals and absence of negative effects on compost quality; d) stable pH, salinity, volatile solids, N, P, Mg, K values.

Increasing consumer awareness of waste disposal issues led a number of industries to look for new materials for manufacturing consumables, to meet sustainability requirements of the market.

Manufacturers of single-serve cartridges (or capsules) for containing ground coffee or other brewable beverages are greatly interested in these improvements and have been developing sustainable solutions.

The following types of cartridges are currently available:

a) rigid or semi-rigid cartridges, comprising a container element made of a rigid or flexible non-compostable material (such as aluminum), and a closure element (also known as lid or membrane), made of aluminum. The two elements are heat-sealed to each other to form a containing cavity in which the brewable or soluble product is held. The cavity has oxygen and water barrier properties. These cartridges must have holes on opposite sides for the brewing or solubilizing liquid to enter the cavity and flow out for beverage dispensing.

b) filter paper cartridges, which both comprise a container body and a closure element made of filter paper or similar materials having no barrier properties. These cartridges oppose no resistance to oxygen and water. This second cartridge design requires the cartridge to be packaged in a barrier enclosure, e.g. made of aluminum, for preserving the organoleptic properties of the product, which requires the use of manufacturing systems having higher power consumption and costs;

c) rigid or semi-rigid cartridges, comprising a container element made of a rigid or flexible compostable material, and a closure element (also known as lid or membrane) made of filter paper. These cartridges oppose no resistance to oxygen and water. This third cartridge design requires the cartridge to be packaged in a barrier enclosure, e.g. made of aluminum, for preserving the organoleptic properties of the product, which requires the use of manufacturing systems having higher power consumption and costs.

US 2017/0107034 discloses a compostable container for preparing single-serve beverages by a dispensing machine, which comprises a container body, a filter and a lid. One of the layers of the lid is made of paper treated with a polymer having oxygen-resistance properties, which imparts barrier properties to the paper layer. The multilayer structure of US2017/0107034 is characterized by an Oxygen Transfer Rate (OTR) of less than 0.3 cc·mil/100 in$^2$·day·atm.

EP2218653 discloses a package comprising a shell, a fibrous layer fixed to a wall of the shell and a closing membrane hermetically fixed to the shell, in which the shell, the fibrous layer and the closing membrane are made of a multilayer of metallized cellulose comprising 2-layers.

US2017/0008694 discloses a capsule comprising a substantially rigid closed container body, having a bottom, side walls and a flange, with a closure element placed thereon to seal the container body. The capsule is made of a laminate comprising at least one oxygen barrier layer, sandwiched between two layers of a water-impermeable material that protect the oxygen barrier layer from alterations. The oxygen barrier layer and the water barrier layer are made of cellulose.

US2014/0037916 discloses a lid for single-serve packages of brewable beverages, comprising a compostable printed paper layer, a PLA layer and a compostable core sandwiched between these layers. A lid so obtained can provide an OTR of 0.4 cc/100 in$^2$/day.

US2014/0366745, by the Applicant hereof, discloses cartridges for coffee or soluble products for producing brewable beverages, comprising a hollow container body having a tubular shape, which is hermetically closed at its opposite bases by a multilayer plastic film comprising a barrier film made of aluminum and at least one plastic film. The plastic film has at least one pre-score, preferably formed by laser, which has the purpose of facilitating rupture of the membrane under the action of the pressurized brewing liquid.

PRIOR ART PROBLEM

Therefore, the aforementioned prior art cartridges comprise materials that do not meet compostability requirements, i.e. the aluminum that is used to form the closure element or the barrier enclosure in which the filter paper cartridge is packaged.

Furthermore, US2017/0107034, EP2218653, US2017/0008694 and US2014/0037916 indicate that the compostable barrier layer of the lid is obtained using paper. For this purpose, paper (which is an inherently compostable material but has no oxygen barrier properties) must undergo suitable processing operations that affect both the cost of the manufacturing process and the resulting performances in terms or Oxygen Transfer Rate. That is, even when paper is treated to assume barrier properties, it does not ensure the achievement of OTR values that will preserve freshness and flavor properties of the soluble products held in the cartridge, for the increasingly long shelf lives required.

The OTR value of the multilayer structure of US2017/0107034 is indicated as 0.3 cc·mil/100 in$^2$·day·atm which, as expressed in SI units, such as cc/m$^2$/day/atm, leads to an OTR value of 4.6.

Finally, the lid of US2014/0366745 is not made of compostable materials and does not meet the compostability requirements as set forth in the standard EN 13421.

OBJECT OF THE PRESENT INVENTION

The invention has the object of providing a closure element, i.e. a membrane or lid, for cartridges that can be composted and can provide a barrier to the cartridge while maintaining the function of the latter, such as the function of dispensing the product by pressurized-fluid brewing.

These objects are fulfilled by a compostable multilayer membrane for cartridges containing soluble products or products adapted to be brewed by pressurized water or other fluid, as defined in the annexed claims.

Advantages of the Invention

The present invention can provide a membrane that has the same barrier properties as aluminum, while meeting compostability requirements.

Furthermore, the present invention can provide a membrane that is able to ensure proper dispensing of the product by pressurized-fluid brewing.

That is, the present invention can provide a cartridge or capsule for soluble products or products adapted to be brewed by pressurized water or other fluid, which comprises a container body made of a biodegradable or compostable material, which defines a hermetically sealed volume at two opposite bases, in which the soluble or brewable product is held, and at least one compostable multilayer membrane.

BRIEF DESCRIPTION OF THE FIGURES

The characteristics and advantages of the present disclosure will appear from the following detailed description of possible practical embodiments thereof, which are shown as non-limiting examples in the drawings, in which.

DETAILED DESCRIPTION OF THE INVENTION

Figure 1:
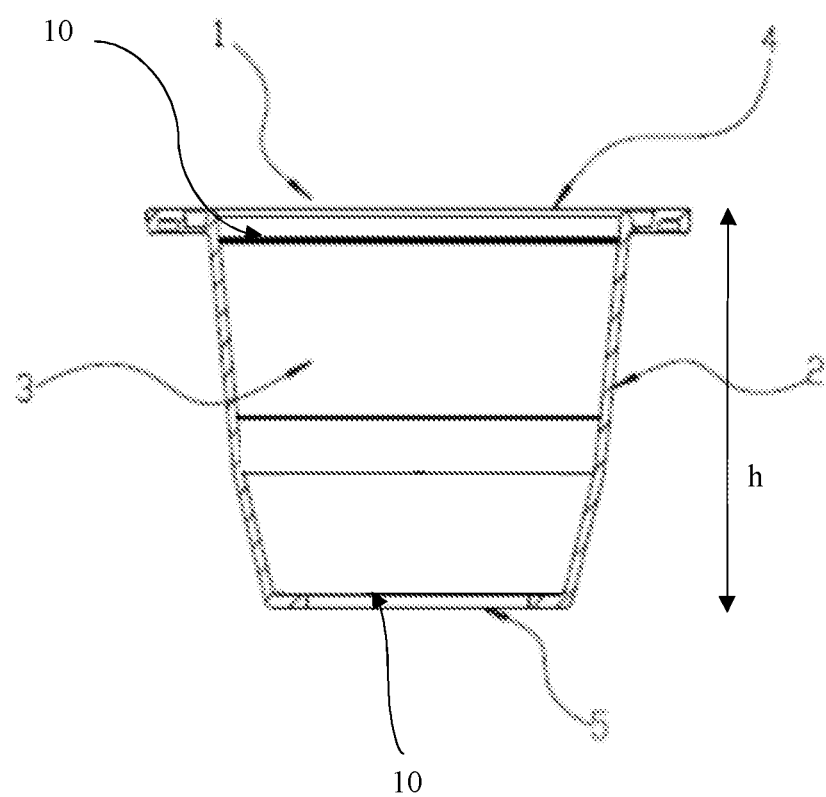
FIG. 1 is a diagrammatic view of a cartridge 1 of the invention, comprising a container body 2 that defines a hermetically sealed volume 3, between the top wall 4 and the bottom wall 5, where the top wall 4 consists of the compostable multilayer membrane of the invention, which acts as sealing membrane.

Although this is not expressly shown, the individual features described with reference to each embodiment shall be intended as auxiliary and/or interchangeable with other features, as described with reference to other embodiments.

The structure and advantages of the multilayer membrane or lid of the invention, as well as the cartridges containing the same, are also described below, with reference to FIG. 3.

As used herein, the term barrier film is intended to designate a film that has oxygen-, water-, gas- or flavor-resistance properties or a combination thereof.

The term-oriented film is intended to designate a polymeric film whose polymer chains are extended and oriented in one or more common directions. The ability of a polymer to withstand a mechanical load depends on the strength of covalent bonds and on the forces between the molecules. In an amorphous system the load is carried by weak Van der Waals interactions occurring between polymeric chains in random "coil" configurations. If a substantial fraction of the polymeric chains may be aligned in the load direction, a greater portion of the load may be transferred to the covalent bonds of the main chain. This orientation results in a greater strength of the oriented material in the orientation direction. Conversely, the orientation has an adverse effect on the layer elongation properties, on easy cutting and sealability.

Irrespective of layer orientation, the compostable multilayer membrane has an elastic modulus, i.e. a puncture resistance, that preferably ranges from 3 N to 30 N, as measured according to ASTM F 1306.

Alternatively, the compostable multilayer membrane has an elastic modulus, i.e. a puncture resistance, that ranges from 2 to 15 N, as measured according to the guidelines of DIN 14477.

In a peculiar aspect, the multilayer membrane 10 has a thickness S that ranges from 40 to 200 μm.

The thickness of the membrane 10 is a critical parameter for the function of a cartridge, as the breaking strength of the cartridge under pressure relies thereon.

The Applicant found that an increased thickness of the material of the membrane 10 would require the dispensing pressure of the brewing fluid to be accordingly increased, which would possibly cause the dispensing machine to be shut down due over-pressure.

In one aspect, the compostable multilayer membrane 10 comprises:
a first barrier layer 11 containing a compostable barrier film;
a metallization state 12;
an intermediate layer 13 containing at least one adhesive;
a second barrier layer 14 containing a compostable barrier film.

Namely, the first barrier layer 11 represents the outer layer and the second barrier layer represents the inner layer of the multilayer membrane 10.

In one aspect, the compostable barrier film of the first barrier layer 11 and the second barrier layer 14 is not made of cellulosic material or paper.

The multilayer membrane 10 comprises a layer 18 adjacent to the first barrier layer 11, on a side opposite to the side upon which the metallization layer 12 has been deposited, which comprises a heat-resistant lacquer.

The layer of heat-resistant lacquer 18 advantageously allows the compostable barrier film of the first barrier layer 11 and the second barrier layer 14 to be formed with products that are not made of cellulosic material or paper, thereby ensuring that the membrane 10 may be sealed to the body of a cartridge.

In one aspect, the compostable multilayer membrane 10 comprises a second metallization layer 17 disposed between the intermediate layer 13 and the second barrier layer 14.

This second metallization layer 17 allows the second layer 14 that contains the compostable film to also have barrier properties.

The embodiments of the compostable multilayer membrane 10 as described below advantageously provide oxygen barrier values, i.e. An Oxygen Transfer Rate (OTR), of less than 0.1 $cc/m^2/day/atm$ at 0% relative humidity (RH) and at 23° C., irrespective of the thickness of the compostable multilayer membrane 10. It shall be further noted that the OTR does not depend on the thickness of the barrier layer 11, 14, but on the metallization layer 12.

As used hereinbelow, the term outer is intended to designate the membrane surface that faces the outside or the surrounding environment, whereas the term inner layer is intended as the surface of the membrane that, in operation, faces the volume enclosed by a cartridge o a container, i.e. the surface of the membrane opposite to the one that faces the outside environment.

1$^{st}$ Embodiment

In a first embodiment, the compostable multilayer membrane 10 comprises first and second barrier layers 11, 14 containing a compostable oriented barrier film.

The Applicant found that the compostable multilayer membrane 10 formed according to the first embodiment, in view of ensuring proper function of the cartridge 1, has an elastic module, i.e. a puncture resistance, preferably ranging from 15 to 30, as measured according to ASTM F 1306.

The preferred compostable oriented film is cellophane, which advantageously exhibit compostabiity and oxygen-resistance properties.

Cellophanes as used for the purposes of the present invention are preferably cellophanes that have tearing or self-tearing properties under the pressure of a fluid.

The metallization layer 12 advantageously increases the oxygen barrier properties of the first barrier layer and creates a moisture barrier.

Metallization can be carried out using well-known techniques, in which, as a rule, the metal selected for deposition is suitably heated and later sprayed on the surface of interest.

Preferably, the metal that is used for the metallization layer 12 is aluminum. More preferably, such aluminum layer has a thickness that ranges from 200 Å to 500 Å.

In one alternative embodiment, the metallization layer 12 is formed by depositing SiOx and AlOx oxides.

The metallization layer 12 and the second barrier layer 14, are separated by an intermediate layer 13 containing at least one adhesive, where said at least one adhesive is preferably selected from compostable or non-biocompostable adhesives.

The weight contribution of said intermediate layer 13 is such that to ensure that, even when at least one non-compostable adhesive is contained, the entire multilayer membrane meets the requirements of biocompostability.

The intermediate layer 13 preferably comprises an adhesive selected from the group composed of polyurethane adhesives; one-, two- or multi-component adhesives; adhesives comprising blocked isocyanates (i.e. isocyanate groups with a protected reactive group that may be removed at high cross-linking temperatures), pressure-sensitive adhesives (PSA). Non-limiting examples of PSA adhesives are, for example, acrylate polymers, butyl, ethylene-vinyl acetate (EVA) rubber with high vinyl acetate content, natural rubber, nitryls, silicone rubbers, which require special "MQ" silicate resin tackifying agents, a monofunctional ("M") trimethyl silane compound reacted with quadrifunctional ("Q") silicon tetrachloride, styrene block copolymers (SBC), also known as styrene copolymer adhesives and rubber-based adhesives, styrene-butadiene-styrene (SBS), styrene-ethylene/butylene-styrene (SEBS), styrene-ethylene/propylene (SEP), styrene-isoprene-styrene (SIS), vinyl ethers and mixtures thereof.

Preferably, the intermediate layer 13 of the compostable multilayer membrane 10 comprises a polyurethane adhesive, preferably a multi-component polyurethane adhesive.

More preferably, the multi-component polyurethane adhesive comprises an isocyanate component. It shall be noted that the isocyanate component may be, for example, of aromatic, aliphatic or cycloaliphatic type and may have an average functionality of more than 2.

By way of illustration and without limitation, said isocyanate may comprise, for example, at least one of toluene diisocyanate (TDI), methylene diphenyl diisocyanate (MDI), phenylene diisocyanate, xilylene diisocyanate, diphenyl methane diisocyanate, polyphenylmethane polyisocyanate (polymeric MDI), naphthalene diisocyanate, triphenylmethane triisocyanate, diphenyl sulfone diisocyanate, cyclohexane diisocyanate, ethylene diisocyanate, propylene diisocyanate, tetramethylene diisocyanate, examethylene diisocyanate, isophorone diisocyanate (IPDI), dimers and trimers of these diisocyanates or mixtures thereof.

In a preferred embodiment, the polyurethane adhesive further comprises a plasticizer.

For the purposes of the present invention, the polyurethane adhesive is preferably a solvent-free, solvent-based or water-based adhesive.

In an alternative embodiment, the polyurethane adhesive preferably comprises at least any one of a conventional commercially available catalyst, an inorganic filler, a dye, an antioxidant, a UV absorber, an adhesion promoter, a calcium oxide, included expandable microspheres (e.g. known under the trade name EXPANCEL®), drying agents, or mixtures thereof.

According to an alternative embodiment, the polyurethane adhesive preferably comprises at least any one of the conventional commercially available organic fillers, chain extenders, UV stabilizers, light stabilizers, fungicides, biocides, antimold agents, flame retardants, surface additives, solvents, mineral oils, dispersing agents, antifoaming agents, storage stabilizers, latent curing agents, cure retarders, solvents, or mixtures thereof.

It shall be noted that in this first embodiment, the compostable multilayer membrane 10 preferably comprises a second metallization layer 17 disposed between the intermediate layer 13 and the second barrier layer 14.

This metallization layer 17 improves the oxygen barrier properties of the second barrier layer and creates a moisture barrier.

Preferably, the metal that is used for the metallization layer 17 is aluminum.

More preferably, such aluminum layer has a thickness that ranges from 200 Å to 500 Å.

Alternatively, the metallization layer 17 is formed by depositing SiOx and AlOx oxides.

Preferably, the multilayer membrane 10 of the invention comprises a heat-resistant lacquer layer 18 adjacent to the first barrier layer 11, on a side opposite to the side upon which the metallization layer 12 is deposited. This heat-resistant lacquer layer 18 faces out of the membrane 10.

Suitable materials for the heat-resistant lacquer include, for example, lacquers based on chlorovinyl resin, polyurethane resin, nitro-polyurethane resin, nitro-acrylic resin; nitrocellulose resin; polyester resin; cellulose; acrylic resin; styrene resin; acrylic-styrene resin; epoxy resin; alkyd resin; melamine resin; siloxane resins; urethane resins; urea resins.

It shall be noted that, according to a more preferred embodiment of the first embodiment, the compostable multilayer membrane 10 comprises a filter 16, adjacent to the second barrier layer 14, on a side opposite to the one that is coupled with the intermediate layer 13 comprising the adhesive.

In the configuration of the compostable multilayer membrane 10, as described hitherto in this first embodiment, the membrane 10 has an OTR value of less than 0.5 cc/m2/day/atm.

If the OTR value is to be calculated as a function of the thickness of the membrane 10 (even though this is inappropriate, as the OTR value of does not depend on the thickness of the barrier layers 11, 14), still in the configuration as described above with reference to the first embodiment, the membrane 10 has an OTR value of 0.057 $cc/100\ in^2/day/atm$.

Preferably said filter 16 is made of a nonwoven fabric, e.g. a polylactic acid (PLA) nonwoven fabric.

The filter 16 may be combined or not combined with the compostable multilayer membrane.

If the filter 16 is combined, it is preferably bonded to the membrane by well-known techniques such as by heat sealing, gluing, spot-gluing and the like, where gluing is preferably carried out by means of compostable or non-compostable adhesives.

According to a more preferred embodiment of the first embodiment, the compostable multilayer membrane comprises a third barrier layer 15, interposed between the intermediate layer 13 and the metallization layer 12, comprising a lacquer having oxygen barrier properties.

The lacquer having barrier properties is preferably selected from the group comprising lacquers based on PVDC; polyvinyl alcohol resin as such or modified with silanes; cellulose; acrylic resin; epoxy resin.

Said third barrier layer 15 is preferably coupled to the metallization layer 12 by a primer selected, for example, from polyurethane, isocyanate, isocellulose or the like.

In the configuration of the compostable multilayer membrane 10, as described hitherto in this first embodiment, which also comprises the lacquer having barrier properties 15, the membrane 10 has an OTR value of less than 0.1 $cc/m^2/day/atm$.

$2^{nd}$ Embodiment

Figure 3:
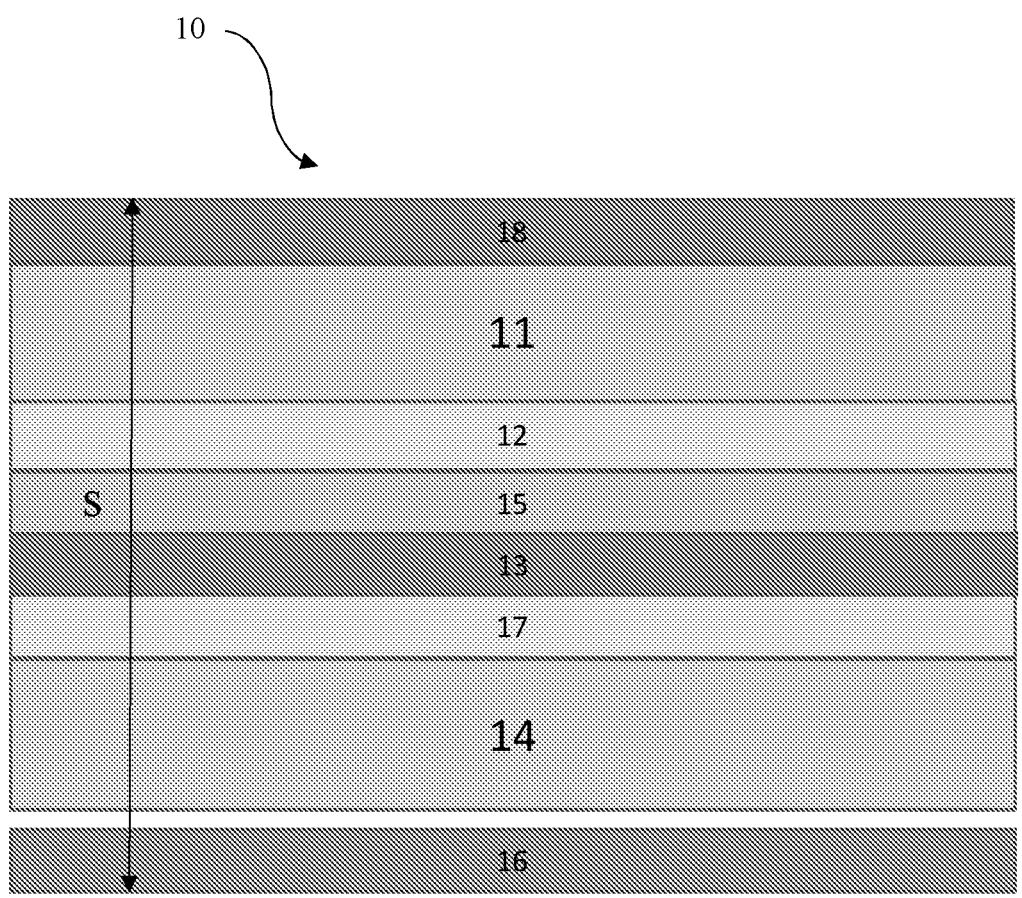
FIG. 3 shows a diagrammatic view of the compostable multilayer membrane of the invention.

In a second embodiment of the compostable multilayer membrane 10, also referring to FIG. 3, the membrane comprises first and second barrier layers 11, 14 containing a compostable non-oriented barrier film.

It shall be noted that the considerations suggested for the first embodiment are also applicable to the second embodiment.

Namely, according to said second embodiment, the compostable multilayer membrane 10 has an elastic modulus that ranges from 3 to 20 N, as measured according to ASTM F 1306 and a thickness S that ranges from 40 to 200 µm.

Said compostable non-oriented film is, for example, a polymeric film formed by the cast technology, based on polyesters, polylatic acid, starch resins or the like.

Advantageously said compostable non-oriented film has remarkable fragility features.

A polymeric film is deemed to be non-oriented when the polymeric chains are in a random coil configuration and no common direction of orientation can be identified. Generally, non-oriented polymeric films are amorphous polymeric films.

The metallization layer 12 advantageously increases the oxygen-proof properties of the first barrier layer and creates a moisture barrier.

Metallization can be carried out using well-known techniques, in which, as a rule, the metal selected for deposition is suitably heated and later sprayed on the surface of interest.

Preferably, the metal that is used for the metallization layer is aluminum. More preferably, such aluminum layer has a thickness that ranges from 200 Å to 500 Å.

Alternatively, the metallization layer 12 is formed by depositing SiOx and AlOx oxides.

The metallization layer 12 is separate from the second barrier layer 14 by an intermediate layer 13 containing at least one adhesive, where said at least one adhesive is preferably selected from compostable or non-compostable adhesives.

The weight contribution of said intermediate layer 13 is such that to ensure that, even when at least one non-compostable adhesive is contained, the entire multilayer membrane meets the requirements of biocompostability.

The intermediate layer 13 preferably comprises a polyurethane adhesive which, for the purposes of the present invention, may be a one- or two-component adhesive and is preferably a solvent-free, solvent-based or water-based adhesive.

In an alternative embodiment, the compostable multilayer membrane 10 comprises an additional metallization layer 17 disposed between the intermediate layer 13 and the second barrier layer 14.

It shall be noted that, in an alternative embodiment, the membrane of the invention comprises an outer layer 18 adjacent to the first barrier layer 11, on a side opposite to the side upon which the metallization layer 12 has been deposited, which comprises a heat-resistant lacquer.

Suitable materials for the heat-resistant lacquer include, for example, lacquers based on chlorovinyl resin, polyurethane resin, nitro-polyurethane resin, nitro-acrylic resin; nitrocellulose resin; polyester resin; cellulose; acrylic resin; styrene resin; acrylic-styrene resin; epoxy resin; alkyd resin; melamine resin; siloxane resins; urethane resins; urea resins.

It shall be noted that, according to a more preferred embodiment, the multilayer membrane 10 comprises a filter 16, adjacent to the second barrier layer 14, on a side opposite to the one that is coupled with the intermediate layer 13 comprising the adhesive.

Preferably said filter 16 is made of a nonwoven fabric, e.g. a polylactic acid (PLA) nonwoven fabric.

The filter 16 may be combined or not combined with the compostable multilayer membrane.

If the filter 16 is combined, it is preferably bonded to the membrane by well-known techniques such as by heat sealing, gluing, spot-gluing and the like, where gluing is preferably carried out by means of compostable or non-compostable adhesives.

According to a more preferred embodiment, the compostable multilayer membrane 10 comprises a third barrier layer 15, interposed between the intermediate layer 13 and the metallization layer 12, comprising a lacquer having oxygen barrier properties.

The lacquer having barrier properties is preferably selected from the group comprising lacquers based on PVDC; polyvinyl alcohol resin as such or modified with silanes; cellulose; acrylic resin; epoxy resin.

Said third barrier layer 15 is preferably coupled to the first metallization layer 12 by a primer selected, for example, from polyurethane, isocyanate, isocellulose or the like.

3$^{rd}$ Embodiment

In a third embodiment, the compostable multilayer membrane 10 comprises a first barrier layer 11 containing a compostable non-oriented barrier film and a second barrier layer 14 containing a compostable oriented film.

It shall be noted that the considerations suggested for the first and second embodiments are also applicable to the third embodiment.

Here, the compostable multilayer membrane 10 ha an elastic modulus that preferably ranges from 9 to 16 N, as measured according to ASTM F 1306.

Figure 2:
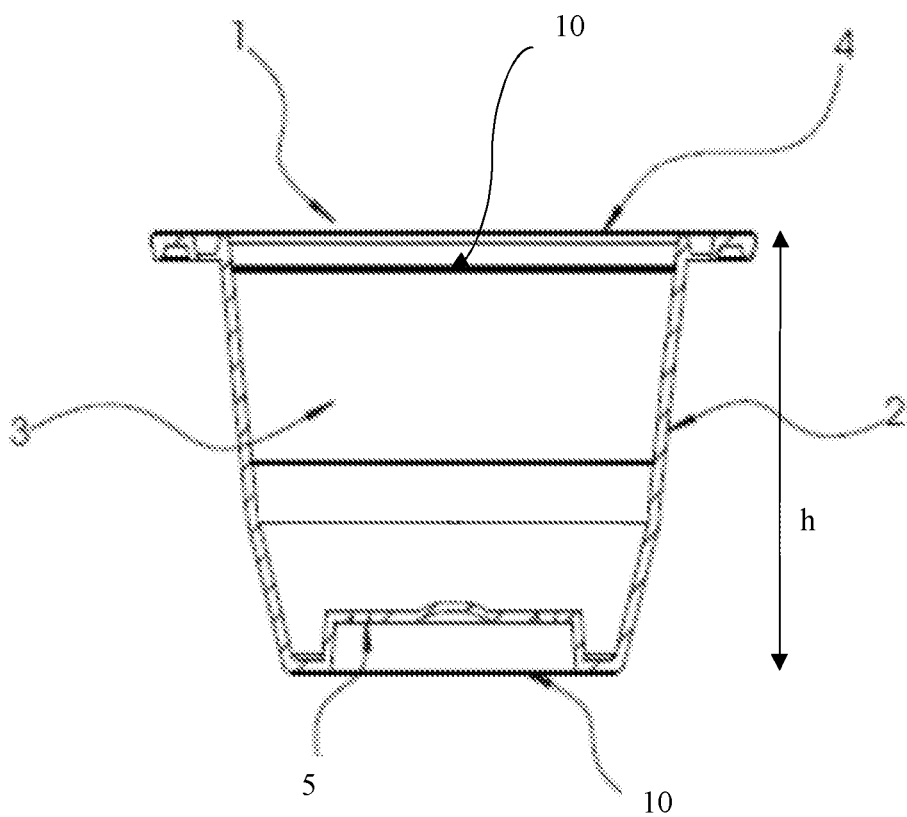
FIG. 2 is a diagrammatic view of a cartridge 1 of the invention, comprising a container body 2 that defines a hermetically sealed volume 3, between the top wall 4 and the bottom wall 5, and a partition 6 for closing the bottom wall 5.

Referring now to FIGS. 1 and 2, special implementations of the compostable multilayer membrane 10 in cartridges 1 containing coffee or other soluble or brewable products will be described.

It shall be noted that the compostable multilayer membrane 10 may be used in cartridges 1 of any shape and size, that have to meet compostability and barrier property requirements.

FIG. 1 schematically shows a cartridge 1 of the present invention for containing coffee or other soluble or brewable products, which comprises a container body 2 made of biodegradable material, defining a closed volume 3 at two opposite bases 4 and 5 in which the soluble or brewable product (not shown) is held.

Namely, one base defines a top wall 4 and the other base defines the bottom wall 5 that hermetically seal the volume 3.

The top wall 4 and the bottom wall 5 define a height h of the container body 2. Said height preferably ranges from 20 to 30 mm.

As used hereinbelow, the term biodegradable is intended as the ability of organic substances and materials to be degraded to simpler molecules through a series of irreversible chemical reactions. The level of biodegradation required for a material to be certified as biodegradable is at least 90% to be reached in less than 6 months.

The container body of the biodegradable cartridge 1 is selected, for example, from the group comprising biodegradable materials such as corn starch, potato starch, cellulose, Mater-Bi and/or any combination of these materials.

In an alternative embodiment, the container body 2 of the cartridge 1 is formed with a compostable material, e.g. a compostable cast material based on polyesters/PLA/starch resins and the like.

It shall be noted that at least one of the top wall 4 and the bottom wall 5 or both are composed of the compostable multilayer membrane 10 as described herein.

The compostable multilayer membrane 10 can advantageously preserve the organoleptic properties of the soluble or brewable product during transport and storage, by providing oxygen- and water-barrier properties, while ensuring compliance with the biodegradabilty and/or biocompostability requirements, as it constitutes a hermetic seal for the volume 3.

The membrane 10 also advantageously exhibits such penetrability/frangibility and/or thickness properties as to be opened under the pressure of the brewing liquid. In this respect, for the pressurized water or other fluid to flow through the volume containing the brewable or soluble product, the membrane 10 is preferably broken by cusps or needles.

The compostable multilayer membrane 10 is not scored.

It shall be noted that, in certain embodiments of the cartridge of the invention, the compostable multilayer membrane 10 may contact the brewable or soluble product in the cartridge via the filter 16 contained therein.

In a second embodiment of the cartridge 1, also referring to FIG. 2, the bottom wall 5 is recessed toward the hermetically sealed volume 3.

In this embodiment, a volume is defined between the bottom wall 5 and the membrane 10 as the latter is separate from the bottom wall 5.

Those skilled in the art will obviously appreciate that a number of changes and variants as described above may be made to fulfill particular requirements, without departure from the scope of the invention, as defined in the following claims.

The invention claimed is:

1. A compostable multilayer membrane, for cartridges containing soluble products or products adapted to be brewed by pressurized water or other fluid, the compostable multilayer membrane comprising:
   a first barrier layer containing a compostable barrier film;
   a first metallization layer;
   an intermediate layer containing at least one adhesive;
   a second barrier layer containing a compostable barrier film;
   a layer adjacent to the first barrier layer, on a side opposite to the first metallization layer, the adjacent layer comprising heat-resistant lacquer;
   a second metallization layer between the intermediate layer and the second harrier layer; and
   a filter made of nonwoven fabric;
   wherein the compostable barrier film of the first barrier layer is not made of cellulosic material,
   wherein the compostable barrier film of the second barrier layer is not made of cellulosic material,
   wherein the compostable multilayer membrane has an Oxygen Transfer Rate (OTR) value lower than 0.5 cc/m$^2$/day/atm, and
   wherein the filter is adjacent to the second barrier layer on a side opposite to the intermediate layer.

2. The compostable multilayer membrane of claim 1, wherein a thickness of the compostable multilayer membrane is greater than or equal to 40 microns (μm) and less than or equal to 200 μm.

3. The compostable multilayer membrane of claim 1, wherein the compostable multilayer membrane has an elastic modulus greater than or equal to 3 Newtons (N) and less than or equal to 30 N, as measured according to ASTM F 1306.

4. The compostable multilayer membrane of claim 1, wherein the compostable barrier film of the first barrier layer is oriented or non-oriented, and
   wherein the compostable barrier film of the second barrier layer is oriented or non-oriented.

5. The compostable multilayer membrane of claim 1, wherein the at least one adhesive comprises: polyurethane adhesives;

one-, two-, or multi-component adhesives; adhesives comprising blocked isocyanates; or pressure-sensitive adhesives (PSA).

6. The compostable multilayer membrane of claim 1, further comprising:
a third barrier layer containing lacquer having oxygen-barrier properties;
wherein the compostable multilayer membrane has an OTR value lower than 0.1 cc/m$^2$/day/atm.

7. The compostable multilayer membrane of claim 6, wherein the lacquer having oxygen-barrier properties comprises lacquers based on polyvinylidene chloride (PVDC); polyvinyl alcohol resin as such or modified with silanes; cellulose; acrylic resin; or epoxy resin.

8. The compostable multilayer membrane of claim 1, wherein the first metallization layer is composed of aluminum and/or the second metallization layer is composed of aluminum.

9. The compostable multilayer membrane of claim 8, wherein a thickness of the first metallization layer is greater than or equal to 200 Angstroms (Å) and less than or equal to 500 Å.

10. The compostable multilayer membrane of claim 1, wherein the first metallization layer and/or the second metallization layer are formed by deposition of SiOx and AlOx oxides.

11. The compostable multilayer membrane of claim 1, further comprising:
a third barrier layer between the intermediate layer and the first metallization layer;
wherein the third barrier layer comprises lacquer having oxygen: barrier properties.

12. The compostable multilayer membrane of claim 11, wherein the lacquer having oxygen-barrier properties comprises lacquers based on polyvinylidene chloride (PVDC); polyvinyl alcohol resin as such or modified with silanes; cellulose; acrylic resin; or epoxy resin.

13. The compostable multilayer membrane of claim 11, wherein the lacquer having oxygen-barrier properties is coupled to the first metallization layer using primer.

14. The compostable multilayer membrane of claim 1, wherein the compostable barrier film of the first barrier layer is oriented, and
wherein the compostable barrier film of the second barrier layer is oriented.

15. The compostable multilayer membrane of claim 1, wherein the compostable barrier film of the first barrier layer is oriented, and
wherein the compostable barrier film of the second barrier layer is non-oriented.

16. The compostable multilayer membrane of claim 1, wherein the compostable barrier film of the first barrier layer is non-oriented, and
wherein the compostable barrier film of the second barrier layer is oriented.

17. The compostable multilayer membrane of claim 1, wherein the compostable barrier film of the first barrier layer is non-oriented, and
wherein the compostable barrier film of the second barrier layer is non-oriented.

18. The compostable multilayer membrane of claim 2, wherein the compostable multilayer membrane has an elastic modulus greater than or equal to 3 Newtons (N) and less than or equal to 30 N, as measured according to ASTM F 1306.

19. The compostable multilayer membrane of claim 8, wherein a thickness of the second metallization layer is greater than or equal to 200 Angstroms (Å) and less than or equal to 500 Å.

20. The compostable multilayer membrane of claim 12, wherein the lacquer having oxygen-barrier properties is coupled to the first metallization layer using primer.

* * * * *